UNITED STATES PATENT OFFICE.

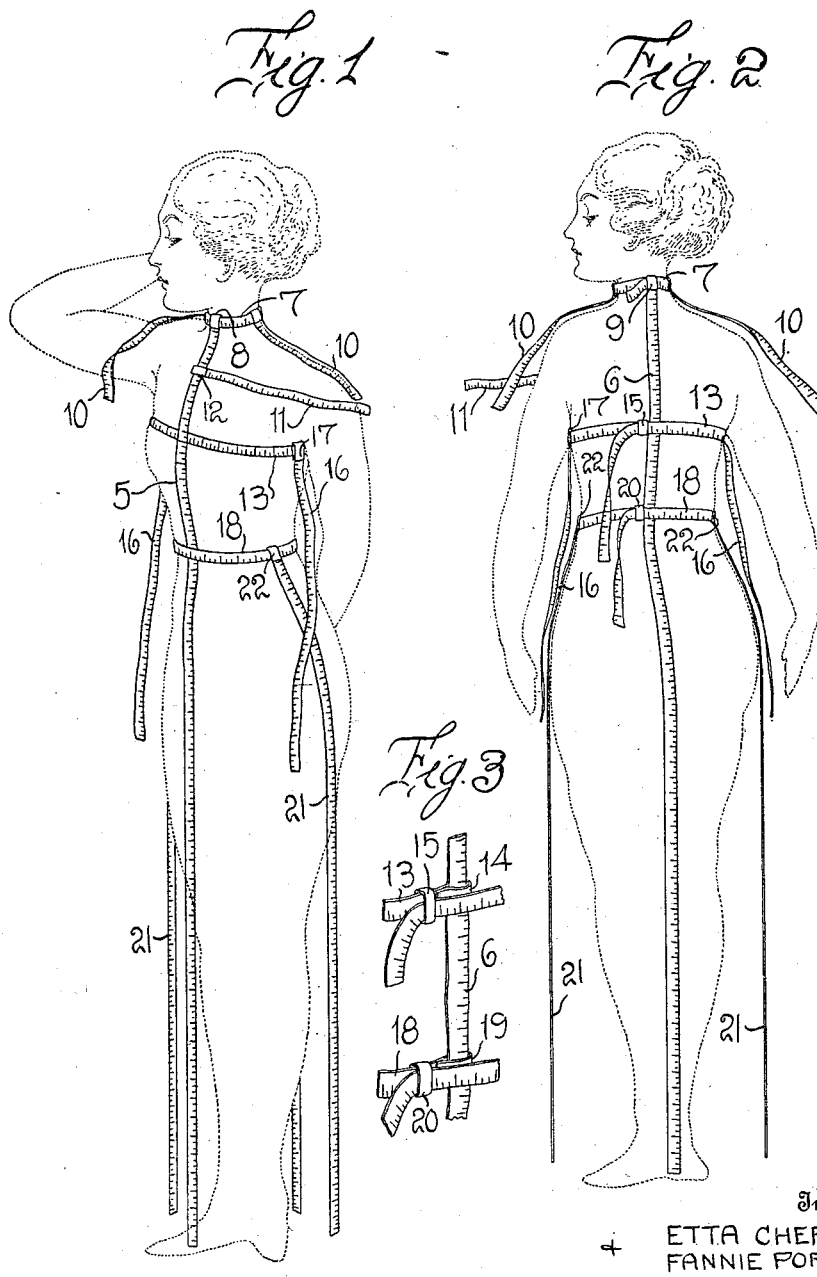

ETTA CHERRIE AND FANNIE PORTER, OF ENID, OKLAHOMA.

MEASURING DEVICE.

1,278,107.  Specification of Letters Patent.  Patented Sept. 10, 1918.

Application filed April 7, 1917.  Serial No. 160,459.

*To all whom it may concern:*

Be it known that we, ETTA CHERRIE and FANNIE PORTER, citizens of the United States, residing at Enid, in the county of Garfield and State of Oklahoma, have invented certain new and useful Improvements in Measuring Devices, of which the following is a specification, reference being had to the accompanying drawings.

This invention relates to an improved measuring device and more particularly to a dressmaker's or tailor's measure which may be manipulated with ease and facility for the purpose of measuring the human form so that garments subsequently completed from such measurements will accurately and properly fit the figure.

It is another and more particular object of our invention to provide a device for the above purpose, which includes a plurality of measuring tapes connected for relative adjustments so that they may be applied to different parts of the form and the desired measurements accurately ascertained.

It is a further general object of our invention to provide an apparatus for the above purpose, which is exceedingly simple, may be manufactured and sold at small cost, and is highly serviceable and convenient in practical use.

With the above and other objects in view, our invention consists in the novel features of construction, combination and arrangement of parts to be hereinafter more fully described, claimed and illustrated in the accompanying drawing, in which, Figure 1 is a perspective view showing our improved measuring apparatus applied to a human figure;

Fig. 2 is a rear elevation; and

Fig. 3 is an enlarged fragmentary perspective view.

Our improved measuring device, in its preferred form, includes a plurality of measuring tapes or strips. These tapes are of non-metallic material, such for instance, as strong paper or fabric, and are properly graduated so that the measurements may be taken therefrom to be afterward noted in the cutting of the various parts of the garment.

In the accompanying illustration, we have shown our invention used for the purpose of obtaining the necessary measurements, whereby a lady's waist and skirt may be accurately cut. In the drawing, 5 designates the front tape, and 6 the rear or back tape. These tapes are sufficiently long to extend from the neck of the person being measured, to the floor. 7 designates the neck tape which is loosely engaged through a terminal loop 8 on the upper end of the front vertical tape 5. The rear or back vertical tape 6 also has a loop 9 on its upper end, to which one end of the neck tape is permanently connected, the other end portion of the neck tape being adjustable through said loop. Tapes 10 are also connected to the neck tape 7, whereby the shoulder length measurements may be taken. A third tape 11 has a loop 12 formed in one end slidably engaged upon the front vertical tape 5, and by means of this tape 11, the chest measurement is taken.

13 designates a horizontal tape which is adapted to extend around the body under the armpits, and a loop 14 is formed in one end of this tape, loosely engaged upon the rear vertical tape 6. The other end of this tape 13 is adapted to be drawn through a loop or eye 15 on the tape 13. Additional tapes 16 are connected to the tape 13 by the sliding loops 17 engaged on the latter tape, and these tapes 16 are used for the purpose of obtaining the measurements from the armpits to the waist, and the measurements over the shoulder blades at the back. The tape 16 is also used for measuring from the armpits over the bust to the tape 5, and from the armpits to the back tape 6. Also, the proper length of the sleeves and over the point of the shoulder to the tape 13, is obtained by the use of the tape 16.

The waist tape 18 has a loop 19 on one end loosely engaged upon the back tape 6, and a buckle loop 20 is also loosely engaged on the tape 18 through which the other end of said tape is drawn so that the tape may be tightened around the waist. Tapes 21 are also connected by the terminal loops 22 and the tapes 18, and by means of these latter tapes the measurements over the hips are taken. The tapes 21 may also be of sufficient length to enable the skirt length measurements to be taken at either side thereof, while the tapes 5 and 6 provide means for ascertaining the skirt length at the front and back respectively.

From the foregoing description, taken in connection with the accompanying drawing, the construction and manner of use of our measuring device will be clearly and fully understood. After the several measurements have been taken and recorded, and suitable memoranda made thereof, the tapes may be removed from the figure by simply disconnecting the ends of the waist, bust, and neck tapes, it being unnecessary to entirely disconnect or separate the several tapes from each other. Thus, it will be apparent that our improved measure may be very easily and quickly applied to or removed from the human form and the proper measurements procured with a minimum loss of time and a high degree of accuracy.

It is manifest of course, that if desired, any additional number of tapes for taking measurements from other parts of the form, may be added. It is, therefore, to be understood that while we have herein shown and described the preferred construction, form and relative arrangement of the several elements of the device, the same are susceptible of considerable modification and we, therefore, reserve the privilege of adopting all such legitimate changes as may be fairly embodied within the spirit and scope of the invention as claimed.

Having thus fully described our invention, what we desire to claim and secure by Letters Patent is:—

A measuring device for the purpose stated, consisting of waist, bust and neck tapes to be disposed horizontally, front and back tapes to extend lengthwise of the body adjustably connected at one of their ends to the neck tape, said waist and bust tapes each being provided with a loop on one end having slidable engagement upon the back tape, and additional measuring tapes adjustably connected at one of their ends to each of said first named tapes.

In testimony whereof we hereunto affix our signatures in the presence of two witnesses.

ETTA CHERRIE.
FANNIE PORTER.

Witnesses:
E. N. BEARD,
R. E. SMITH.

Copies of this patent may be obtained for five cents each, by addressing the "Commissioner of Patents, Washington, D. C."